United States Patent
Kowalski et al.

(10) Patent No.: US 11,081,990 B2
(45) Date of Patent: Aug. 3, 2021

(54) METHOD FOR OPERATING A STEAM TURBINE

(71) Applicant: Siemens Aktiengesellschaft, Munich (DE)

(72) Inventors: Matthias Kowalski, Mulheim an der Ruhr (DE); Roland Sievert, Duisburg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 16/645,106

(22) PCT Filed: Aug. 21, 2018

(86) PCT No.: PCT/EP2018/072551
§ 371 (c)(1),
(2) Date: Mar. 6, 2020

(87) PCT Pub. No.: WO2019/057423
PCT Pub. Date: Mar. 28, 2019

(65) Prior Publication Data
US 2021/0028730 A1 Jan. 28, 2021

(30) Foreign Application Priority Data

Sep. 21, 2017 (EP) .................................. 17192398

(51) Int. Cl.
| | | |
|---|---|---|
| *H02P 9/08* | (2006.01) | |
| *F01D 15/10* | (2006.01) | |
| *F01D 19/02* | (2006.01) | |
| *F01D 25/12* | (2006.01) | |
| *F01K 7/16* | (2006.01) | |
| *H02P 101/20* | (2015.01) | |

(52) U.S. Cl.
CPC ............... *H02P 9/08* (2013.01); *F01D 15/10* (2013.01); *F01D 19/02* (2013.01); *F01D 25/12* (2013.01); *F01K 7/165* (2013.01); *H02P 2101/20* (2015.01)

(58) Field of Classification Search
CPC ........ H02P 9/08; H02P 2101/20; F01D 15/10; F01D 19/02; F01D 25/12; F01K 7/165
USPC .............................................. 290/2; 60/687
See application file for complete search history.

(56) References Cited

U.S. PATENT DOCUMENTS

| | | | |
|---|---|---|---|
| 3,147,599 A * | 9/1964 | Frankel | F01D 25/26 60/687 |
| 3,950,950 A * | 4/1976 | Doerner | F01D 15/10 60/657 |
| 6,545,373 B1 | 4/2003 | Andres et al. | |
| 7,804,215 B2 * | 9/2010 | Hemmelmann | F03D 80/60 310/104 |
| 10,352,824 B2 * | 7/2019 | Long | G01M 15/14 |
| 10,788,399 B2 * | 9/2020 | Long | G01M 15/14 |
| 10,941,666 B2 * | 3/2021 | Davies | F01D 1/02 |
| 2010/0079016 A1 * | 4/2010 | Hemmelmann | F03D 80/60 310/54 |
| 2015/0098792 A1 | 4/2015 | Doebbeling et al. | |
| 2015/0134270 A1 * | 5/2015 | Long | G01M 15/14 702/33 |
| 2015/0318763 A1 | 11/2015 | Kubota et al. | |
| 2016/0226325 A1 * | 8/2016 | Grau Sorarrain | H02K 9/19 |
| 2016/0305280 A1 * | 10/2016 | Grau Sorarrain | F01K 7/16 |
| 2016/0344258 A1 | 11/2016 | Japikse et al. | |
| 2017/0257007 A1 * | 9/2017 | Braam | H02K 7/1807 |
| 2017/0264169 A1 * | 9/2017 | Kowalski | H02K 9/18 |
| 2019/0257209 A1 * | 8/2019 | Davies | F01D 5/06 |
| 2019/0353559 A1 * | 11/2019 | Long | G01M 15/14 |

FOREIGN PATENT DOCUMENTS

| | | |
|---|---|---|
| EP | 2447482 A1 | 5/2012 |
| JP | 2005501498 A | 1/2005 |
| JP | 2015518103 A | 6/2015 |
| JP | 2016073129 A | 5/2016 |
| JP | 2016201926 A | 12/2016 |
| WO | 2009038562 A2 | 3/2009 |
| WO | 2011018404 A1 | 2/2011 |

OTHER PUBLICATIONS

PCT International Search Report and Written Opinion of International Searching Authority dated Nov. 21, 2018 corresponding to PCT International Application No. PCT/EP2018/072551 filed Aug. 21, 2018.

\* cited by examiner

*Primary Examiner* — Pedro J Cuevas

(57) ABSTRACT

A method for operating a steam turbine, wherein the pressure of the cooling medium in the generator is changed not only for cooling but also for increasing or decreasing the torque of the generator on the steam turbine, this being utilized for the purpose of the start-up or shut-down process.

9 Claims, No Drawings

METHOD FOR OPERATING A STEAM TURBINE

CROSS REFERENCE TO RELATED APPLICATIONS

This application is the US National Stage of International Application No. PCT/EP2018/072551 filed 21 Aug. 2018, and claims the benefit thereof. The International Application claims the benefit of European Application No. EP17192398 filed 21 Sep. 2017. All of the applications are incorporated by reference herein in their entirety.

FIELD OF INVENTION

The invention relates to a method for operating a steam turbine, wherein the steam turbine has a rotatably mounted steam turbine rotor and a housing which is arranged around the steam turbine rotor, wherein the rotor is coupled in terms of torque to a generator rotor of an electrical generator, wherein the generator is cooled with a cooling medium, in particular air, wherein a cooling pressure of the cooling medium in the generator is set, wherein the generator rotor exerts a torque on the steam turbine rotor.

BACKGROUND OF INVENTION

Steam turbines are used for example in steam power plants or gas and steam turbine power plants, and principally have the task of converting thermal energy into mechanical energy so as to drive the rotor of an electrodynamic machine, in particular an electrical generator. Here, a hot steam with relatively high thermal energy is conducted via inflow regions into the steam turbine, wherein the steam thermally expands, and in the process cools, on a flow path within the steam turbine, wherein the thermal energy is converted into rotational energy of the steam turbine rotor. During continuous operation, the components of the steam turbine and of the electrical generator are in a thermal state of equalization. However, operating states which require a shutdown of the steam turbine and, in turn, a startup of the steam turbine are required.

The startup and shutdown of a steam turbine are characterized by several challenges. During the startup of a steam turbine, this is flowed through merely by a relatively small steam mass flow. The consequence is that the available quantity of steam is not sufficient for sufficiently homogeneous throughflow of the end stage, the radial pressure drop consequently promoting a tendency to separation on a hub side. It may then occur that, due to the rotational movement of the steam turbine rotor, due to the reverse flow and due to the resulting friction losses of the blades, the steam is heated. The consequence of this is that the end stage blades are continuously heated. In this case, it may occur that the temperatures reach impermissible values and consequently limit the availability of the steam power plant.

A further challenge is that, in a high-pressure section of the steam turbine, with a power supply disconnection, the expansion generates only very little power. Otherwise, the steam power plant would enter a so-called excessive rotational speed state, which is manifested in an increased rotational speed of the steam turbine rotor. In this case, very high temperatures at the outlet of the high-pressure turbine section cannot be avoided and, with a so-called hot start, can possibly lead to a shutdown. Through provision of braking power in the strand which is formed by the steam turbine rotor and the rotor of the electrical generator, a relatively high pressure drop with a corresponding temperature reduction can in this case be realized at the high-pressure turbine section without the rotational speed increasing in this case beyond the nominal frequency, with the generator in this case not outputting any electrical power.

The proposed additional braking power helps during shutdown since the rotational speed blocking ranges (risk of resonance of components, such as for example blades) are quickly passed through, in particular with low-tuned end stages.

A further challenge is that the steam turbine, in particular before and in the first expansion section, is heated through more quickly due to an increased pressure or the associated condensation temperature, which increases the availability of the plant.

In documents WO2009/038562 A2, WO2011/018404 A1 and US 2016/344258, various methods for operating a steam turbine are disclosed.

It would be desirable to eliminate the aforementioned problems.

SUMMARY OF INVENTION

It is therefore the object of the invention to specify a method for operating a steam turbine in which the startup and shutdown processes are improved.

Said object is achieved by a method for operating a steam turbine, wherein the steam turbine has a rotatably mounted steam turbine rotor and a housing which is arranged around the steam turbine rotor, wherein the rotor is coupled in terms of torque to a generator rotor of an electrical generator, wherein the generator is cooled with a cooling medium, in particular air, wherein a cooling pressure of the cooling medium in the generator is set, wherein the generator rotor exerts a torque on the steam turbine rotor, wherein the torque from the generator rotor to the steam turbine rotor is changed by means of a change in the cooling medium pressure. The object is also achieved by an automation unit for implementing such a method.

The invention proposes the use as a brake of the generator coupled in terms of torque to a steam turbine. Here, the generator is cooled with air during operation. An increase in the air pressure in the generator leads to increased gas friction losses by way of surface friction, fan power and conveying action of the rotor or radial fan. The torque to the steam turbine rotor that is transmitted from the electrical generator rotor can thus be changed by setting the pressure of the cooling air. This relationship is utilized in order to optimally utilize the method for operating a steam turbine, in particular during startup and shutdown.

One advantage of the invention is that, due to this additional possibility of conversion in the form of heat in the generator, instead of into turbine rotational speed, it is possible for a larger steam mass flow to be conducted through the steam turbine, or it is possible for a higher steam pressure to be set, without introducing an excessive rotational speed.

For example, the braking power of a generator, owing to the gas friction, can increase from approximately 1 megawatt to 2 megawatts if the air pressure of the cooling air is increased from one bar to 2 bar. Consequently, the braking power would increase from for example 1.5 megawatts to 2.5 megawatts. Such an increase in the braking power could lead to a possible increase in mass flow of approximately 66%, with respect to the comparable startup process.

With the invention, it has been identified that the generated additional friction losses in the generator lead to an increase in enthalpy of the cooling gas in the generator. In this case, the temperature is not increased; the heat capacity correspondingly increases with increasing air density. The heat energy is cooled in gas coolers of the generator, wherein there is consequently a closed gas cooling circuit in the generator, or is discharged to the surroundings in an open cooling circuit.

One advantage of the invention is that existing plants merely have to be retrofitted or adapted in order to achieve the effects according to the invention.

With the invention, regulation which additionally sets the generator gas pressure with respect to the steam turbine at startup and/or shutdown of the steam turbine is thus proposed. The plant availability can be increased in this way. Furthermore, a reduction in the ventilation at the steam turbine end stages is advantageously achieved, which leads to a minimization of service life consumption.

Furthermore, the high-pressure exhaust steam temperature of the steam turbine is advantageously actively influenced, which leads to an increase in availability. This, for example, allows the so-called cold reheater line to be of a less expensive design. Furthermore, when use is made of the method according to the invention, startup lines could be dispensed with.

One significant advantage of the invention is the minimization of blade fatigue with passing-through of the rotational speed blocking ranges. This leads to significant lengthening of the service life of the steam turbine blades.

It is also advantageous that, due to the increase in condensation temperature during warmup, a relatively fast startup of the steam turbine is possible.

The aforementioned properties, features and advantages of the present invention, and the manner in which these are achieved, will be explained in a clearer and more clearly understandable manner in conjunction with the following description of an exemplary embodiment.

DETAILED DESCRIPTION OF INVENTION

A steam power plant or a gas and steam turbine plant generally has a steam turbine comprising a high-pressure turbine section, a medium-pressure turbine section and a low-pressure turbine section. Steam is generated in a steam generator and is conducted via a fresh steam line to the high-pressure turbine section. The steam flowing out of the high-pressure turbine section is correspondingly cooled and has a relatively low pressure. This cooled steam is conducted via a cold reheater line to a reheater and, there, heated to a relatively high temperature again. Subsequently, the reheated steam passes via the hot reheater line to the medium-pressure turbine section, and then flows from the medium-pressure turbine section to the low-pressure turbine section and, from there, directly into a condenser, where the steam is condensed to form water and is correspondingly conducted via pumps to the steam generator again. The circuit is thus closed. During the startup process, the components must be correspondingly heated, which requires a certain period of time. The steam turbine has a steam turbine rotor which is rotatably mounted, wherein a housing is arranged around the steam turbine rotor. The steam turbine rotor is coupled in terms of torque to a generator rotor. This means that the torque of the steam turbine rotor that is generated by the steam turbine exerts a torque on the generator rotor.

The electrical generator has a rotatably mounted generator rotor on which a rotor winding is arranged. A relatively high electric current flows through the rotor winding, by way of which current a magnetic field is generated, which, by way of the rotation, transfers an alternating magnetic field to a stator winding of a winding of a stationary part that is situated in the generator housing. An electric voltage is induced in the winding of the stationary part. Due to the relatively high currents in the rotor winding and in the stator winding, it is necessary for these to be cooled. A winding is cooled for example with air. In this case, the air pressure has an influence on the cooling power and on the torque of the generator rotor, since an increase in the air pressure results in the gas friction being increased, which leads to gas friction losses and consequently to increased negative torques. The stator winding may be cooled for example likewise with air or with nitrogen or with water. The cooling pressure of the cooling medium, cooling air in this case, can be set. An automation unit allows the cooling pressure to be set such that the torque from the generator rotor to the steam turbine rotor is changed, this being utilized in particular during the startup and/or shutdown processes. For example, during the startup process, an increase in pressure can lead to an increased negative torque of the generator rotor on the steam turbine rotor, which can be used for increasing the pressures or mass flows in the steam turbine without an excessive rotational speed.

The increase in the pressure of the cooling medium, air in electrical generators in this case, has hitherto been used only for the cooling. With the automation unit, regulation which additionally sets the generator gas pressure with respect to the desired load of the steam turbine at startup and/or shutdown of the steam turbine is now realized.

Even though the invention has been illustrated and described in more detail by way of the preferred exemplary embodiment, the invention is not restricted by the examples disclosed, and other variations may be derived therefrom by a person skilled in the art without departing from the scope of protection of the invention.

The invention claimed is:

1. A method for operating a steam turbine, wherein the steam turbine has a rotatably mounted steam turbine rotor and a housing which is arranged around the steam turbine rotor, wherein the rotor is coupled in terms of torque to a generator rotor of an electrical generator, the method comprising:
    cooling the generator with a cooling medium, wherein a cooling pressure of the cooling medium in the generator is set,
    exerting a torque by the generator rotor on the steam turbine rotor,
    changing the torque from the generator rotor to the steam turbine rotor by means of a change in the cooling pressure.

2. The method as claimed in claim 1,
    wherein an increase in the cooling pressure leads to an increase in the torque from the generator rotor to the steam turbine rotor.

3. The method as claimed in claim 1,
    wherein a reduction in the cooling pressure leads to a reduction in the torque from the generator rotor to the steam turbine rotor.

4. The method as claimed in claim 1,
    wherein the cooling pressure is changed during a startup process of the steam turbine.

5. The method as claimed in claim 1,
    wherein the cooling pressure is changed during the shutdown process of the steam turbine.

6. The method as claimed in claim 1,
wherein an automation system for regulating the cooling pressure is designed such that an increase in the pressure and/or in the mass flow of the steam into the steam turbine is realized within specific limits.
7. The method as claimed in claim 6,
wherein the automation system is furthermore designed such that a change, or a reduction, in the mass flow of the steam into the steam turbine is realized within specific limits.
8. The method as claimed in claim 7,
wherein the change in the mass flow is realized in a manner dependent on the braking load provided by the generator.
9. The method as claimed in claim 1,
wherein the cooling medium comprises air.

\* \* \* \* \*